United States Patent [19]

Stockton

[11] Patent Number: 4,479,404
[45] Date of Patent: Oct. 30, 1984

[54] CONCENTRIC POWERTRAIN FOR ELECTRIC VEHICLE

[76] Inventor: Thomas R. Stockton, 4014 Earhart Rd., Ann Arbor, Mich. 48105

[21] Appl. No.: 299,907

[22] Filed: Sep. 8, 1981

[51] Int. Cl.³ .................. F16H 37/08; F16H 37/06; F16H 57/10; F16H 3/44
[52] U.S. Cl. .................... 74/695; 74/720.5; 74/768; 74/789
[58] Field of Search .............. 74/768, 769, 785, 694, 74/695, 789, 720.5, 686

[56] References Cited

U.S. PATENT DOCUMENTS

| | | | |
|---|---|---|---|
| 3,106,107 | 10/1963 | Hardy | 74/688 |
| 3,195,371 | 7/1965 | Christie | 74/695 |
| 3,250,150 | 5/1966 | Stockton | 74/688 |
| 3,255,643 | 6/1966 | Hause | 74/695 |
| 3,410,157 | 11/1968 | Livezey | 74/768 |
| 3,491,621 | 1/1970 | Moan | 74/695 |
| 3,688,600 | 9/1972 | Leonard | 74/688 |
| 3,722,323 | 3/1973 | Welch | 74/769 |
| 3,770,074 | 11/1973 | Sherman | 74/674 |
| 3,800,626 | 4/1974 | Koivunen | 74/695 |
| 3,971,267 | 7/1976 | Murakami et al. | 74/769 |
| 3,986,413 | 10/1976 | Stockton | 74/688 |
| 4,304,153 | 12/1981 | Moroto et al. | 74/765 |

*Primary Examiner*—Leslie A. Braun
*Assistant Examiner*—Bruce F. Wojciechowski

[57] ABSTRACT

The powertrain of a motor vehicle driven by an electric motor has three interconnected planetary gear sets having an input through the sun gear of the first planetary set and output through the carrier of the third planetary gear set to a transaxle differential. Brakes and clutches operating in conjunction with the ring gear of the first planetary set and carriers of the second and third planetary sets provide two speed ratios. For reverse drive the same brakes are applied as in the first gear ratio and the motor is driven in reverse.

11 Claims, 5 Drawing Figures

CONCENTRIC POWERTRAIN FOR ELECTRIC VEHICLE

BACKGROUND OF THE INVENTION

1. Field of the Invention

This invention pertains to a multiple speed ratio automatic transmission for use with an electrically driven automotive vehicle.

2. Description of the Prior Art

Conventional automatic transmissions used in vehicles powered by internal combustion engines are not readily adapted for use in an electrically driven vehicle. The parasitic losses associated with operation of the hydraulic pump, control system and torque converter could reduce the operating range of an electrical vehicle by approximately 15 percent. Furthermore, certain major automatic transmission components such as the hydrokinetic torque converter and reverse gearing are unnecessary in an electric vehicle that uses an a.c. induction motor whose rotation can be reversed. Also the final drive or axial ratio used with conventional automatic transmissions would limit the operating speed of the electrical motor and this would result in substantial cost, weight and size penalties.

The most favorable balance among costs, weight, efficiency and package size for an electric vehicle powertrain is realized with electric motors that operate in the range between 8000 and 10,000 rpm with an automatic transmission compatible with these speeds. An automatic transmission develops the maximum vehicle driving range through efficient control of the motor operation and because regenerative braking, which recovers braking energy to recharge the propulsion battery, can be readily incorporated.

A variety of motor-transmission configurations are possible in the front wheel drive vehicles. Two or three rotational axes interconnected by gear or chain transfer drives are generally employed to provide step transmission ratios and the final drive ratio. The differential double gear system is usually located on the drivewheel axis. A front wheel drive system wherein the motor and transmission are mounted transversely with respect to the fore and aft axis of the vehicle, must be a highly compact unit and preferably one in which the high speed a.c. motor, automatic transmission and final drive have a common axis with the wheel axis.

SUMMARY OF THE INVENTION

A high speed a.c. motor, automatic transmission and final drive are integrated in a single transaxle system according to this invention. Planetary gearing produces multiple speed ratios and the final drive ratio. The motor rotor shaft is hollow allowing one drive shaft to pass through its center from the differential double gear assembly to a universal constant velocity joint. The transaxle input sun gear can be cut directly on the end of the rotor shaft. A significant saving in gearing, connecting parts, housings and rotating shaft seals is realized. A manual parking mechanism having a pawl actuated through a linkage to the shift selector lever engages a cog on the differential housing thereby locking the driveshafts and wheels. The first gear ratio is produced without the need for hydraulic control pressure and thereby allows the vehicles to be operated in the event of a failure or a leak in the hydraulic control system.

The conventional automatic transmission practice of driving the hydraulic oil pump directly by the prime mover, in this case an electric motor, would result in an unnecessary power loss under most operating conditions and would limit the vehicle driving range. Here, instead, the hydraulic supply pump is driven by a separate small motor which operates only on demand. Full pump displacement is required only during a transmission upshift interval of approximately 0.5 seconds. Otherwise, the hydraulic supply pump need be operated only occasionally to accommodate system leakage. A second electrically driven oil pump operating at low pressure, at approximately 15 psi, circulates oil to an oil cooler and provides motor and transaxle lubrication and motor cooling capability. Both pumps draw oil from a common transaxle oil sump that supplies hydraulic fluid for both the lubrication and cooling systems.

In a dual flow motor cooling system, the motor rotor is cooled directly through passages formed in the rotor laminations and in the rotor stator by oil flowing on both ends of the stator windings. The heated oil returns by gravity to the sump. The oil cooler includes a small radiator with an electrically driven cooling fan that is activated upon demand to control the oil temperature. This avoids an unnecessary power loss when oil temperature is lower than the upper limit. Cooling system response is superior to external oil jacket cooling of the stator and to conventional air cooling through the rotor-stator air gap.

The drive system, according to this invention, can be adapted for use in rear wheel drive vehicles and would replace the hypoid rear axle propeller shaft and universal joints usually required in such vehicles.

DESCRIPTION OF THE PREFERRED EMBODIMENT

Figure 1A:
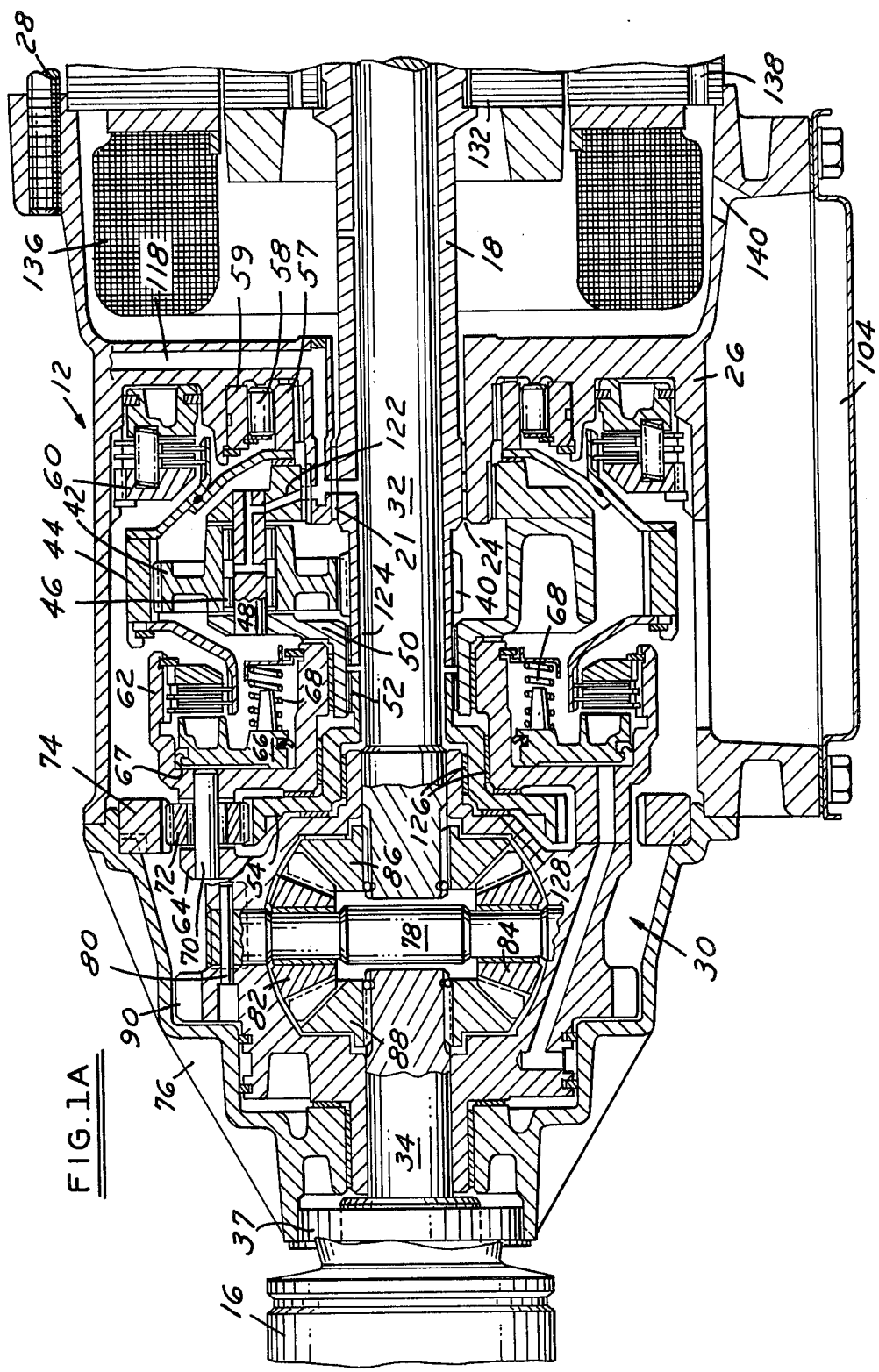
FIG. 1A is an elevation cross section through the centerline of an automatic power transmission according to this invention.

An a.c. induction motor 10 is mounted coaxially with a two-speed planetary automatic transmission 12 and constant velocity joints 14, 16 which transmit power to the right and left drive wheels of the vehicle. The rotor shaft 18 of the motor is a sleeve shaft supported at one end on a bearing 20 whose outer race is supported on the motor casing 22. The opposite end of the motor shaft is journalled at 24 on a support surface of the transmission casing 26, which is joined to the motor casing by the attachment bolts 28.

The differential mechanism 30 transmits torque to a first drive shaft 32 that extends coaxially with the transmission and motor and is located within and supported on the inner surface of the rotor shaft 18. A second drive shaft 34 transmits torque to the inner constant velocity joint 16 of a half shaft assembly that transmits power to the left drive wheel of the vehicle. Oil seals 36, 37 seal the lubrication system adjacent bearing 20 and the support surface for the second driveshaft 34.

The two-speed planetary automatic transmission for use with the motor 10 has a first stage that includes a sun gear 40 that may be formed integrally with the rotor shaft 18. Multiple planetary pinions 42 located in the annular space within the ring gear 44 are in continuous meshing engagement with sun gear 40 and ring gear 44. Each pinion 42 is mounted for rotation by needle bearings 46 on a pin 48 that is supported at each end by a planetary pinion carrier 50. Carrier 50 is splined at 52 to an axially extending portion of a second sun gear 54 that is a part of a second transmission stage. The mounting flange for pin 48 at the opposite axially end of carrier 50 is rotatably supported on the annular portion 26 of the transmission casing upon which the rotor shaft is journalled at 24.

Ring gear 44 is connected to the inner driver element 57 of an overrunning brake 58 whose outer element 59 is secured to the transmission casing against rotation. Ring gear 44 is also connected to a disc brake 60 that operates to produce reverse drive, hill braking in low gear and regenerative braking. When brake 60 is applied, ring gear 44 is fixed to the transmission casing against rotation. The hydraulically actuated high gear clutch 62, operates to connect ring gear 44 to the carrier 64 of the second transmission stage. Clutch 62 includes a piston 66 that moves within a cylinder 67. Return springs 68 located within the annulus of the clutch operate to return piston 66 to the position shown in FIG. 1 when hydraulic pressure is removed from cylinder 67. When piston 66 is actuated by hydraulic fluid, the discs of the clutch are forced into frictional engagement with discs that are connected to carrier 64 upon which the planetary pinions of the second stage are mounted by pin 70. High gear clutch 62 produces a driving connection between ring gear 44 and the carrier 64.

The second transmission stage includes the second sun gear 54 which is in continuous meshing engagement with multiple second stage planetary pinions 72 that are located within the annular region defined by the second ring gear 74. Pinions 72 are mounted for rotation on shaft 70 which is supported on the second stage carrier 64. Ring gear 74 is permanently fixed against rotation to a second portion of the transmission housing 76 that is mechanically joined to the first transmission housing 26.

The differential mechanism 30 includes a bevel pinion shaft 78 that is joined by multiple roll pins 80 to the carrier 64 of the second transmission stage. Upper and lower bevel pinions 82, 84, fixed securely to pinion shaft 78, are held in continuous meshing engagement with bevel gears 86, 88, respectively, that are splined to the driveshafts 32, 34. A parking gear 90 integrally formed with carrier 64 operates to prevent rotation of driveshafts 32, 34 because it is fixed by the pin 80 to bevel pinion shaft 78.

To disposition the transmission for first gear forward speed operation neither brake 60 nor clutch 62 need be engaged. Instead, overrunning brake 58 is arranged so that its inner race or driving member 57 transmits torque to the outer race 59, thus fixing ring gear 44 against rotation by way of the fixed connection between the outer race and the transmission casing. Pinion carrier 50, the driven member of the first stage, transmits power to the second sun gear 54 through the spline connection 52. The second planetary stage has its ring gear 74 permanently fixed against rotation, therefore, the planetary pinion carrier 64 is the driven element of the second stage. The bevel pinion shaft 78 rotates about the central axis of the transmission as carrier 64 rotates. Power is therefore transmitted to the driveshafts 32, 34 by way of the engagement of the bevel pinions 82, 84 with the bevel gears 86, 88.

High speed ratio results when high gear clutch 62 is engaged and brake 60 is disengaged. When this occurs, overrunning brake 58 does not operate to lock ring gear 44 to the transmission casing, but rather connects ring gear 44 to pinion carrier 64. Pinion carrier 50 of the first stage is permanently connected to sun gear 54 on the second stage through spline 52. The torque delivery path for high speed ratio operation includes the first sun gear 40, which is driven by the rotor shaft 18; the first planet pinion carrier 50, which drives the second sun pinion 54; and the first ring gear 44, which is drivably connected by clutch 62 to the second planet pinion carrier 64. The second ring gear 74 fixed to the transmission casing provides the torque reaction for the transmission in high gear. Pinion carrier 64 drives the bevel pinion shaft 78 in rotation about the central axis of the transmission and bevel pinions 82, 84 drive bevel gear 86, 88 thereby transmitting power to the driveshafts 32, 34.

Reverse drive results when the rotational direction of the motor is reversed and reverse brake 60 is applied. When the direction of the motor is reversed, brake 58 overruns but first ring gear 44 is fixed against rotation when the reverse brake 60 is applied. In this instance, the torque delivery path is identical to that of the low speed ratio forward drive previously described. Rotor shaft 18 drives the sun gear 40 and first planet carrier 50 drives second sun gear 54. The first and second ring gears are fixed against rotation and provide torque reaction points for the transmission. Output power is transmitted by the second planetary carrier 64 to the bevel pinion shaft 78 which transmits torque to the driveshafts 32, 34.

Figure 3:
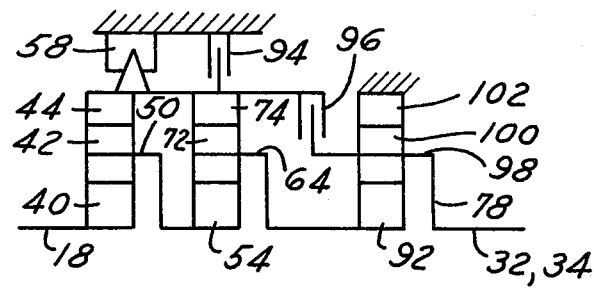
FIG. 3 shows schematically the gear arrangement, brakes and clutches of an alternate transmission having three planetary gear units for use with an a.c. induction motor.

A second embodiment of the transmission, one that employs a third planetary gear unit to produce the two forward speed ratios and the reverse drive, is shown in FIG. 3.

Figure 2:
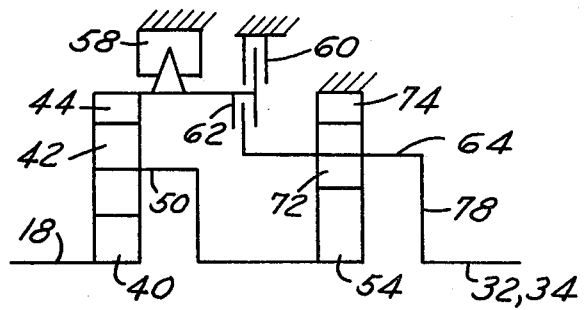
FIG. 2 shows schematically the gear arrangement, brakes and clutches of the transmission of FIG. 1A.

In FIG. 3, components of the first and second planetary gear units have the same identifying numbers as the components shown in FIG. 2 to which they correspond. Rotor shaft 18 transmits drive from the electric motor 10 to the first sun gear 40. The first ring gear is connected to the driving elements of the overrunning brake 58 whose outer element is fixed to the transmission casing against rotation. The first planet pinion set is rotatably mounted on the carrier 50, which drives the second sun gear 54. A second set of planet pinions is rotatably mounted on a carrier 64 which drives a third sun gear 92. The ring gear 74 of the second planetary unit can be selectively fixed against rotation by way of reverse brake 94. Similarly, the second ring gear may be selectively connected by application of high speed ratio clutch 96 to a third planet pinion carrier 98 on which a third set of planetary pinions 100 are rotatably mounted. The third ring gear 102 is permanently fixed to the transmission casing against rotation.

First speed ratio results although neither brake 94 nor clutch 96 is applied. Instead, overrunning brake 58 fixes the first ring gear against rotation and provides a second torque reaction point in addition to that of third ring gear 102. Carrier 50, which drives the second sun gear 54, is the driven element of the first planetary set. Carrier 64, which drives the third sun gear 92 is the driven element of the second planetary gear set. Finally, the third pinion carrier 98 drives the bevel pinion shaft 78, which distributes power to the driveshafts 32, 34.

High speed ratio operation results when the high speed ratio clutch 96 is applied and the reverse brake 94 is inoperative. In this case, ring gear 102 provides the only torque reaction point for the transmission, since brake 58 is overrunning. Carrier 50, the driven element of the first gear set, drives the second sun gear 54. Carrier 64, the driven element of the second gear set, drives sun gear 92. The first and second ring gears 44, 74 are drivably connected through clutch 96 to the third pinion carrier 98, which drives the bevel pinion shaft 78.

Figure 4:
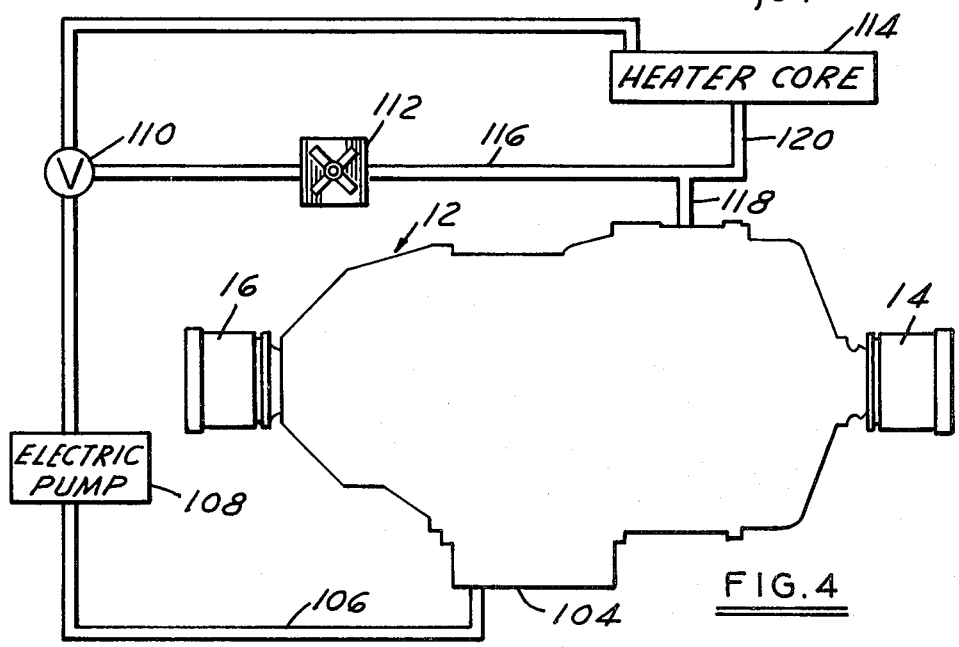
FIG. 4 is a schematic diagram of a system by which heat can be removed from the oil used to lubricate the transmission and to cool the rotor and stator of the motor.

Reverse drive is accomplished with the transmission arrangement of FIG. 4 upon application of the reverse brake 94 provided high speed gear ratio clutch 96 is not applied. Brake 94 prevents rotation of the first and second ring gears 44, 74 as did the overrunning brake 58 in the low speed forward drive condition. For reverse drive, however, the direction of rotation of the motor and rotor shaft 18 is reversed from that of low speed forward drive. Pinion carriers 50 and 64 drive the sun gears 54, 92 of the second and third gear units. Since each ring gear is fixed against rotation, the driven member is planet carrier 98 which transmits power to the bevel pinion shaft 78.

The braking for an electric vehicle can be used to recharge the batteries provided the control system for the vehicle is adapted to run the motor as a generator when braking occurs, rectify the a.c. current to a d.c. current and charge the battery during the braking action. This regenerative braking system can be used in cooperation with the power train of this invention if the control system is adapted to actuate the reverse brake 60 or 94 when braking occurs. The electrical brake torque used to drive the generator during regenerative braking is recovered from the wheels of the vehicle and transmitted back through the transmission provided the transmission is disposed as has been described for reverse drive.

Similarly, a hill braking function, whereby kinetic energy of the vehicle can be recovered and converted to electrical energy to recharge the batteries when the vehicle is rolling down hill, can be accommodated by a control system that is adapted to sense the need for braking in this condition. When hill braking is integrated in the control scheme, the transmission will be disposed for reverse drive so that power is transmitted from the driveshafts through the differential and the transmission to drive rotor shaft 18. This is accomplished when the reverse drive brake 60 or 94 is actuated and the high speed ratio clutch 62 or 96 is disengaged.

Preferably, the motor that drives the electric vehicle through the transmission of this invention, is an hermetically sealed a.c. induction motor. The motor stator and rotor are cooled by the circulation of oil which is used also to lubricate the transmission. The motor, cooling system and transaxle lubrication system share a common oil pump and sump.

Figure 1B:
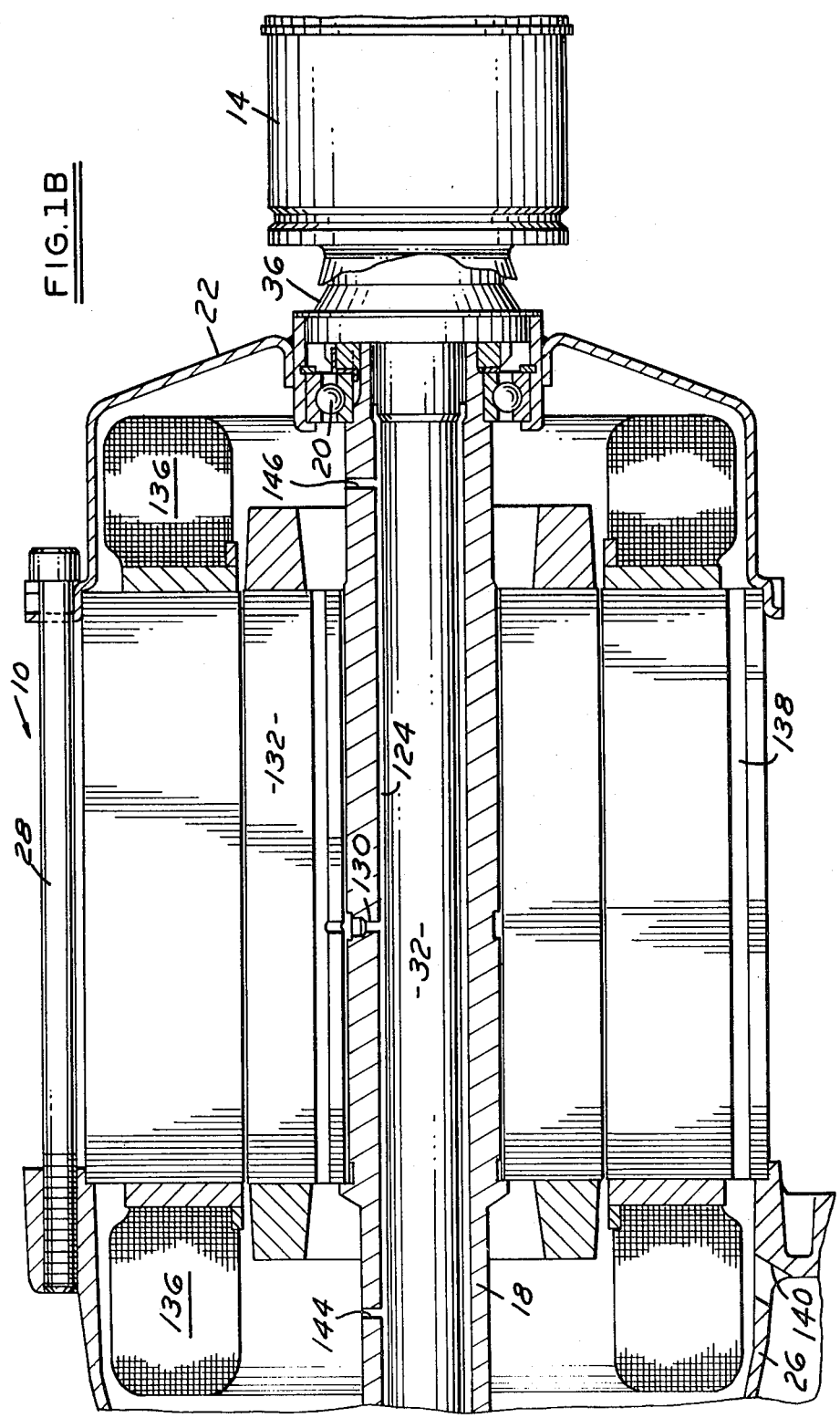
FIG. 1B is an elevation cross section through the centerline of an induction motor that drives the transmission of FIG. 1A.

Referring now to FIGS. 1A, 1B and in particular to FIG. 4, the electric motor 10 and transmission 12 are shown assembled about a common axis representing the axis of the driveshafts that transmit power to the drive wheels of the vehicle. If the motor-transmission assembly is used in a front wheel drive vehicle, power is transmitted to the wheels through constant velocity joints 14 and 16. If, however, the transaxle is used to drive the rear wheels of the vehicle, the differential transmits power from the driveshafts to the wheels without the need for the constant velocity joints. The cooling and lubricating oil flows by gravity into a sump 104 shown best in FIG. 1a. The sump is connected by oil line 106 to a low pressure circulating pump 108 driven by a variable speed electric motor. A control valve 110 directs the flow of oil to a radiator 112 or to a heater core 114. The heat content of the oil is transferred by the radiator to an air stream forced through the air radiator by an electrically driven fan which delivers the heat to the atmosphere. The cooled oil is carried in oil line 116 and through an oil inlet duct 118 through which the oil enters the transaxle assembly. If control valve 110 directs oil to the heater core, the heat content of the oil can be exchanged with air passing through the heater core to heat the passenger compartment. The cooled oil is carried by line 120 and inlet oil line 118 to the transaxle.

Within the transmission, the oil is directed to the needle bearings 46 that support the first planetary pinion set on pin 48 through oil lines 122 formed in the transmission casing and in the carrier 50. Oil is delivered to the annular space 124 between the inside diameter of the rotor shaft 18 and the outside diameter of the driveshaft 32 and is supplied by way of this passage through bushings 126 and thrust washers 128 to lubricate the gears of the second planetary gear unit. Oil is delivered under approximately 15 psi. pressure to the inlet duct 118. Oil flows by gravity from the lubricated gear surfaces to the sump 104.

The annular space 124 is used to supply coolant to the rotor and stator of the motor. Radially directed ducts 130 intersecting passage 124 carry coolant to the rotor 132 through which it flows in both axial directions in ducts 142. The rotor 132 is an assembly of laminants arranged in face-to-face abutment to form a rotor stack. Each laminant has multiple holes through its thickness through which the cooling oil flows. Upon exiting the rotor, oil is thrown by centrifugal force against the inner diameter of the stator windings 136 at each axial end of the rotor. The oil wets the perimeter of the windings and flows by gravity through drain holes 138, 140 into the sump.

Other radial holes 144, 146 formed in rotor shaft 18 intersect the annular space 124 immediately within the inner radius of the windings 136 and provide a passage through which oil is directed against the surface of the windings.

Having described a preferred embodiment of my invention, what I claim and desire to secure by U.S. Letters Patent is:

1. A power transmission mechanism for an automotive vehicle having multiple speed ratios comprising:
   a rotor shaft;
   a first stage planetary gear unit including a first sun gear driven by the rotor shaft, a first ring gear, a first set of planet pinions drivably engaged with the first sun gear and with the first ring gear, and a first pinion carrier having the first set of planet pinions rotatably mounted thereon;
   an overrunning brake having a driven element drivably connected to the first ring gear and a braked element fixed against rotation for establishing a one-way driving connection between the first ring gear and the braked element;

a selectively actuated reverse clutch for fixing the first ring gear against rotation;

a second stage planetary gear unit including a second sun gear drivably connected to the first pinion carrier, a second ring gear fixed against rotation, a second set of planet pinions drivably engaged with the second sun gear and with the second ring gear, and a second pinion carrier having the second set of planet pinions rotatably mounted thereon; and a high speed ratio clutch for establishing and disestablishing a driving connection between the first ring gear and the second pinion carrier.

2. The transmission mechanism of claim 1 wherein the rotor shaft is driveably connected to an electric motor and wherein the reverse brake is applied and the high speed clutch is released while the electric motor is operating in the direction that produces forward drive, whereby power is transmitted from the second pinion carrier to the rotor shaft.

3. A power transmission mechanism for an automotive vehicle having multiple speed ratios comprising:

a rotor shaft;

a first stage planetary gear unit including a first sun gear driven by the rotor shaft, a first ring gear, a first set of planet pinions drivably engaged with the first sun gear and with the first ring gear, and a first pinion carrier having the first set of planet pinions rotatably mounted thereon;

a second stage planetary gear unit including a second sun gear drivably connected to the first pinion carrier, a second ring gear, a second set of planet pinions drivably engaged with the second sun gear and with the second ring gear, and a second pinion carrier having the second set of planet pinions rotatably mounted thereon;

an overrunning brake having a driven element drivably connected to the first and second ring gears and a braked element fixed against rotation for establishing a one-way driving connection between the first and second ring gears and the braked element;

a reverse braked means for selectively fixing the first and second ring gears against rotation;

a third stage planetary gear unit including a third sun gear drivably connected to the second pinion carrier, a third ring gear fixed against rotation, a third set of planet pinions drivably engaged with the third sun gear and with the third ring gear, and a third pinion carrier having the third set of planet pinions rotatably mounted thereon; and a high speed ratio clutch for establishing and disestablishing a driving connection between the first and second ring gears and the third planet pinion carrier.

4. The transmission mechanism of claim 3 wherein the rotor shaft is driveably connected to an electric motor and wherein the reverse brake is applied and the high speed clutch is released while the electric motor is operating in the direction that produces forward drive, whereby power is transmitted from the third pinion carrier to the rotor shaft.

5. The transmission mechanism of claims 1 or 3 further comprising:

a differential mechanism driven by the second planet pinion carrier; and first and second driveshafts for transmitting power from the differential mechanism to 6. The transmission mechanism of claim 5 wherein the axes of the planetary gear units and the axis of the rotor shaft are colinear with the driveshafts.

7. The transmission mechanism of claim 1 or 3 wherein the rotor shaft is driven by an electric motor.

8. The transmission mechanism of claim 6 wherein the rotor shaft has the first sun gear formed integrally therewith and wherein the rotor shaft is a sleeve shaft providing an axial bore through which one of the driveshafts extends.

9. The transmission mechanism of claim 1 or 3 wherein the first speed ratio drive results without applying the reverse brake or the high speed ratio clutch.

10. The transmission mechanism of claim 7 wherein reverse drive is produced by applying the reverse clutch, releasing the high speed ratio clutch and reversing the direction of rotation of the electric motor.

11. The transmission mechanism of claim 1 or 3 wherein the high speed ratio is produced by releasing the reverse brake and by applying the high speed ratio clutch.

* * * * *

UNITED STATES PATENT AND TRADEMARK OFFICE
CERTIFICATE OF CORRECTION

PATENT NO. : 4,479,404
DATED : October 30, 1984
INVENTOR(S) : Thomas R. Stockton It is certified that error appears in the above-identified patent and that said Letters Patent is hereby corrected as shown below:

On the title page Insert:

--(73) Assignee: Ford Motor Company, Dearborn, Michigan --.

Signed and Sealed this

Twenty-sixth Day of March 1985

[SEAL]

Attest:

DONALD J. QUIGG

Attesting Officer

Acting Commissioner of Patents and Trademarks